United States Patent
Nakamura et al.

(10) Patent No.: US 8,616,776 B2
(45) Date of Patent: Dec. 31, 2013

(54) CYLINDRICAL ROLLER BEARING

(75) Inventors: Takeshi Nakamura, Kashiwara (JP);
Yuichiro Hayashi, Yao (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 412 days.

(21) Appl. No.: 12/737,120

(22) PCT Filed: Jun. 9, 2009

(86) PCT No.: PCT/JP2009/060544
§ 371 (c)(1),
(2), (4) Date: Dec. 9, 2010

(87) PCT Pub. No.: WO2009/154106
PCT Pub. Date: Dec. 23, 2009

(65) Prior Publication Data
US 2011/0081105 A1    Apr. 7, 2011

(30) Foreign Application Priority Data

Jun. 17, 2008 (JP) .................................. 2008-158098
Oct. 3, 2008 (JP) .................................. 2008-258444

(51) Int. Cl.
*F16C 19/00* (2006.01)
*F16C 33/48* (2006.01)

(52) U.S. Cl.
USPC ........................................ 384/470; 384/572

(58) Field of Classification Search
USPC .................. 384/462, 470, 523, 572, 614, 623
See application file for complete search history.

(56) References Cited

U.S. PATENT DOCUMENTS

| | | | |
|---|---|---|---|
| 4,226,484 A * | 10/1980 | Glassow et al. | 384/470 |
| 4,639,089 A | 1/1987 | Okada et al. | |
| 5,039,231 A * | 8/1991 | Kispert et al. | 384/572 |
| 6,461,048 B1 | 10/2002 | Ioannides | |
| 2007/0280574 A1* | 12/2007 | Tsujimoto | 384/590 |
| 2007/0292064 A1* | 12/2007 | Fukuda | 384/470 |

FOREIGN PATENT DOCUMENTS

| | | |
|---|---|---|
| CN | 1283256 A | 2/2001 |
| FR | 2 558 627 A1 | 7/1985 |
| FR | 2 588 627 A1 | 7/1985 |
| JP | 5-87326 U | 11/1993 |
| JP | 06-117440 A | 4/1994 |
| JP | 9-151946 A | 6/1997 |
| JP | 11-159535 A | 6/1999 |
| JP | 11-315840 A | 11/1999 |
| JP | 2001-304270 A | 10/2001 |
| JP | 2003-247646 A | 9/2003 |

(Continued)

OTHER PUBLICATIONS

Chinese Office Action dated Sep. 28, 2012.

(Continued)

*Primary Examiner* — James Pilkington
(74) *Attorney, Agent, or Firm* — McGinn IP Law Group, PLLC

(57) ABSTRACT

A guide piece projects from an outside surface of a cage bar of a cage so as to make sliding contact with a raceway surface of an outer ring. As the cage rotates, the guide piece operates to guide the rotation of the cage while removing an excess grease on the raceway surface and transferring the excess grease to axially opposite ends of the outer ring.

5 Claims, 10 Drawing Sheets

(56) References Cited

FOREIGN PATENT DOCUMENTS

| JP | 2005-321049 A | 11/2005 |
|---|---|---|
| JP | 2006-112584 A | 4/2006 |
| JP | 2006-220222 A | 8/2006 |
| JP | 2008-64184 A | 3/2008 |
| JP | 2008-121888 A | 5/2008 |

OTHER PUBLICATIONS

European Search Report dated Dec. 6, 2012.
Japanese Office Action dated Nov. 12, 2013 without English translation.

* cited by examiner

CYLINDRICAL ROLLER BEARING

TECHNICAL FIELD

The present invention relates to a cylindrical roller bearing wherein a plurality of cylindrical rollers are rollably disposed in a cage interposed between an inner ring and an outer ring.

BACKGROUND ART

The cylindrical roller bearing has a plurality of cylindrical rollers rollably disposed between a raceway surface formed substantially centrally on an outer periphery of the inner ring and a raceway surface formed substantially centrally on an inner periphery of the outer ring.

The above cylindrical rollers are circumferentially retained at predetermined intervals by means of the cage interposed between the outer ring and the inner ring. Specifically, the above-described cage forms a plurality of pockets defined by a pair of annular portions opposed to each other and spaced a predetermined distance apart in the axial direction and cage bars extending axially to interconnect the pair of annular portions. The cage is adapted to retain the respective cylindrical rollers in the pockets so that the cylindrical rollers are retained at the predetermined intervals in the circumferential direction.

One of the known examples of the above cylindrical roller bearing is a one wherein guide portions capable of sliding contact with axially opposite ends of the inner periphery of the outer ring are provided on outer peripheries of the respective annular portions, so that the guide portions may guide the rotation of the cage by making sliding contact with the inner periphery of the outer ring during the rotation of the bearing (see, for example, Japanese Unexamined Patent Publication No. 159535/1999).

However, the above-described cylindrical roller bearing has the following problem. Since the cylindrical rollers are confined between the guide portions, grease or lubricating oil supplied onto the raceway surface of the outer ring or a lubricant such as oil supplied by oil-air lubrication is restrained, by the guide portions, from migrating axially outwardly of the cage. Therefore, the lubricant is apt to accumulate on the raceway surface and the accumulated lubricant gives rolling resistance to the cylindrical rollers, so that the bearing is prone to arise in bearing torque.

For the prevention of lubricant accumulation, it may be contemplated to produce a gap between the guide portion and the raceway surface by reducing the overall size of the guide portion, thereby allowing the lubricant to migrate through this gap. However, this approach involves another problem that the cage is prone to eccentricity due to the presence of the gap, disabling the guide portions to guide the rotation of the cage favorably.

DISCLOSURE OF THE INVENTION

In view of the foregoing, the present invention has been accomplished, seeking to provide a cylindrical roller bearing which is capable of favorably guiding the rotation of the cage and preventing the rise of bearing torque induced by the accumulation of lubricant on the raceway surface.

According to the present invention for achieving the above object, a cylindrical roller bearing comprises: an inner ring including a raceway surface on an outer periphery thereof; an outer ring including a raceway surface on an inner periphery thereof; a plurality of cylindrical rollers rollably disposed between the raceway surface of the inner ring and the raceway surface of the outer ring; and a cage for circumferentially retaining the cylindrical rollers at predetermined intervals, and is characterized in that the cage is circumferentially provided with guide pieces at predetermined intervals, the guide piece projecting from a peripheral surface of the cage to make sliding contact with the raceway surface of either of the inner ring or the outer ring for guiding the rotation of the cage and for removing an excess lubricant on the raceway surface.

According to the cylindrical roller bearing of the above arrangement, the guide pieces can favorably guide the rotation of the cage because the guide pieces are adapted to make sliding contact with the raceway surface of the inner or outer ring. The guide pieces are also capable of removing the excess lubricant on the raceway surface in conjunction with the rotation of the cage. Furthermore, the cage is circumferentially provided with the guide pieces at the predetermined intervals so as to allow the excess lubricant to migrate toward the axially opposite ends of the outer or inner ring. It is therefore possible to prevent the rise in bearing torque resulting from the accumulation of excess lubricant on the raceway surface.

It is preferred that the guide pieces are circumferentially provided on an outer periphery of the cage at the predetermined intervals and project toward the raceway surface of the outer ring, and that the guide piece is formed with a through-hole extending from an inner periphery of the cage to an edge of the guide piece for supplying the lubricant from the inner periphery side of the cage to the raceway surface. In this case, the guide pieces can favorably guide the rotation of the cage because the guide pieces are adapted for sliding contact with the raceway surface of the outer ring. The guide pieces are also capable of removing the excess lubricant on the raceway surface in conjunction with the rotation of the cage. Furthermore, the cage is circumferentially provided with the guide pieces at the predetermined intervals so that the excess lubricant is allowed to migrate toward the axially opposite ends of the outer ring. It is therefore possible to prevent the rise in bearing torque resulting from the accumulation of excess lubricant on the raceway surface.

What is more, the lubricant can be supplied from the inner periphery side of the cage to the raceway surface via the through-hole. It is therefore ensured that the bearing can supply the lubricant onto the raceway surface even under a condition where the supply of lubricant tends to run short as a result of removing the excess lubricant from the raceway surface. Thus, the short supply of lubricant can be obviated.

It is preferred that a portion of the guide piece that makes sliding contact with the raceway surface has a shorter axial full length than an axial full length of the raceway surface. In this case, a proper amount of lubricant is allowed to remain on the raceway surface because, if the guide piece is axially deviated to either one side relative to the raceway surface during the rotation of the cylindrical roller bearing, there always exists on the other side of the raceway surface a region which is out of sliding contact with the guide piece, namely the region from which the lubricant is not removed. Hence, the short supply of lubricant can be obviated even under the condition where the supply of lubricant tends to run short as a result of removing the excess lubricant from the raceway surface throughout the axial full length thereof. In addition, the lubricant allowed to remain at least on one axial side of the raceway surface spreads over the raceway surface due to the effect of surface tension or the like, so that the proper amount of lubricant can be supplied onto a rolling surface of the raceway surface, on which the cylindrical rollers are rolled.

It is preferred that a portion of the guide piece that makes sliding contact with the raceway surface has a shorter axial full length than an axial full length of the cylindrical roller. In this case, a proper amount of lubricant is allowed to remain on the rolling surface because the region from which the lubricant is not removed always exists on at least one axial side of the rolling surface of the raceway surface, on which the cylindrical rollers are rolled during the rotation of the cylindrical roller bearing. Hence, the short supply of lubricant can be obviated even under the condition where the supply of lubricant tends to run short as a result of removing the excess lubricant from the rolling surface throughout the axial full length thereof. In addition, the proper amount of lubricant can be supplied onto the rolling surface by means of the cylindrical rollers which are rolled to spread the lubricant allowed to remain on at least one axial side of the rolling surface.

It is preferred that the guide piece makes linear contact with the raceway surface. In this case, the guide piece can achieve a reduced sliding contact resistance. Hence, the cylindrical roller bearing of the present invention can achieve the reduction of bearing torque in contrast to the conventional cylindrical roller bearing wherein the guide portions of the cage make surface contact with the raceway surface.

It is preferred that the guide piece includes a recess formed at an edge thereof for holding therein the lubricant present on the raceway surface. In this case, the recess can temporarily hold the lubricant therein so as to supply the lubricant therefrom even under the condition where the supply of lubricant tends to run short. Thus, the short supply of lubricant can be obviated.

MODES FOR CARRYING OUT THE INVENTION

Figure 1:
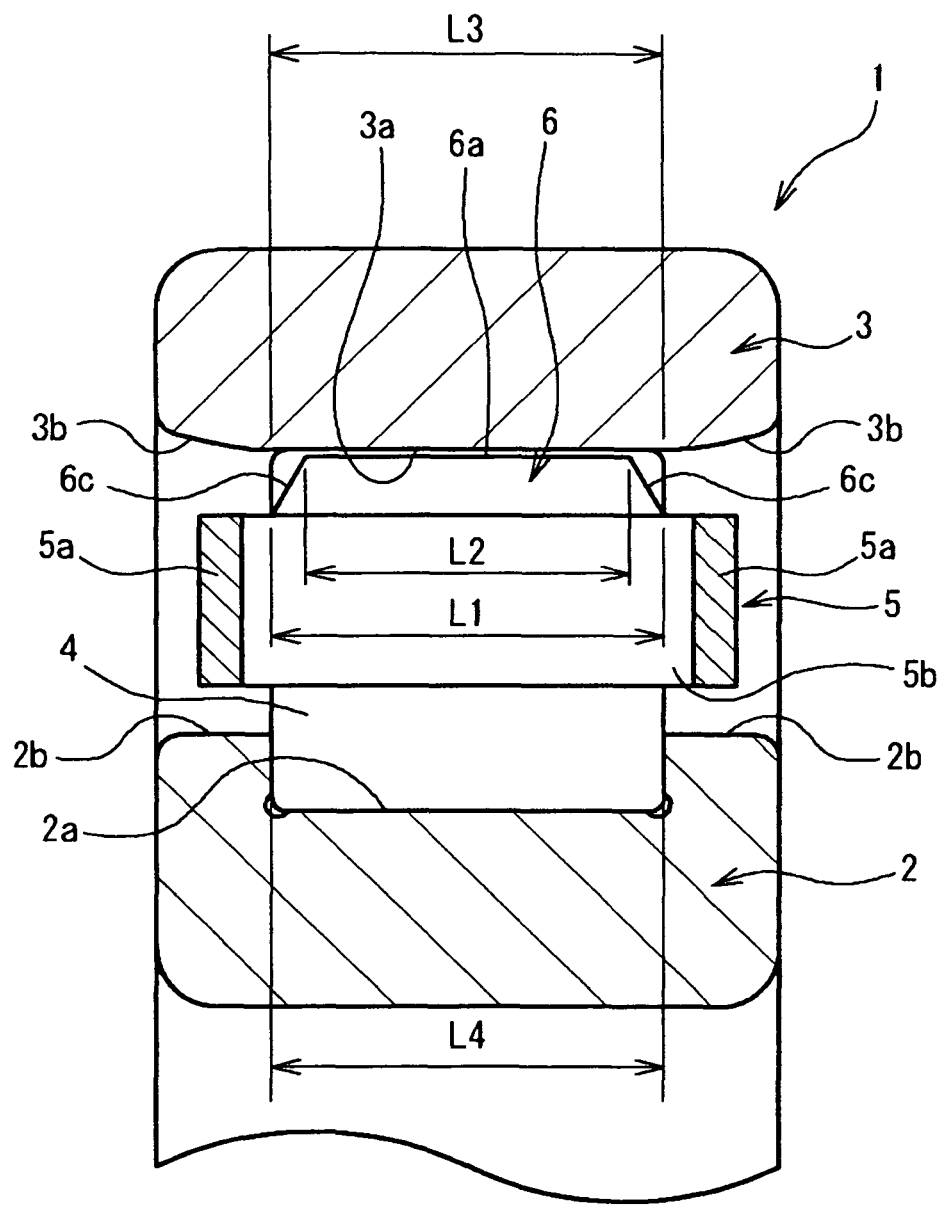
FIG. 1 is a sectional view showing a cylindrical roller bearing according to a first embodiment of the present invention.

The preferred embodiments of the present invention will be described with reference to the accompanying drawings. FIG. 1 is a sectional view showing a cylindrical roller bearing of ribbed inner ring type according to a first embodiment of the present invention.

Referring to FIG. 1, a cylindrical roller bearing includes an inner ring 2 fixed to an unillustrated rotary shaft, an outer ring 3 fixed to an unillustrated housing, a plurality of cylindrical rollers 4 rollably disposed between the inner ring 2 and the outer ring 3, and a cage 5 for circumferentially retaining the individual cylindrical rollers 4 at equal intervals.

The inner ring 2 includes a raceway surface 2a formed axially centrally on an outer periphery thereof, allowing the cylindrical rollers 4 to roll on the raceway surface 2a. The inner ring 2 is integrally formed with ribs 2b which extend from lateral sides of the axially opposite ends of the raceway surface 2a and project toward the outer ring 3.

The outer ring 3 includes a raceway surface 3a formed axially centrally on an inner periphery thereof, allowing the cylindrical rollers 4 to roll on the raceway surface 3a. The outer ring 3 is formed with tapered surfaces 3b at axially opposite ends of the raceway surface 3a, the tapered surface progressively increased in diameter in axially outward direction.

Each of the raceway surfaces 2a and 3a has its entire periphery coated with grease G as a lubricant.

Figure 2:
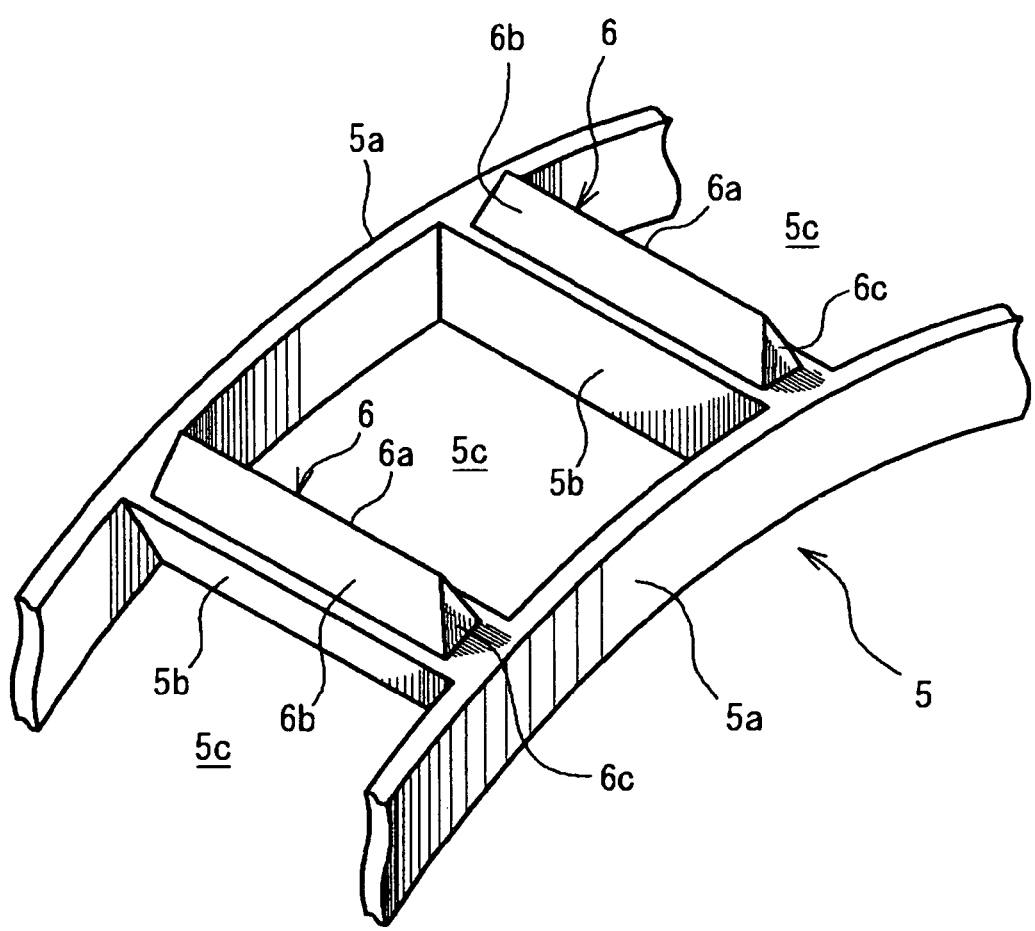
FIG. 2 is a fragmentary perspective view showing an essential part of a cage.

FIG. 2 is a perspective view showing a part of a cage 5. The cage 5 includes a pair of annular portions 5a and 5a axially spaced from each other, a plurality of cage bars 5b arranged circumferentially on the annular portions with equal spacing and interconnecting the annular portions 5a and 5a, and guide pieces 6 for guiding the rotation of the cage 5. The cage receives the individual cylindrical rollers 4 in respective pockets 5c enclosed by respective pairs of adjoining cage bars 5b and the pair of annular portions 5a and 5a, thereby retaining the cylindrical rollers 4 at predetermined intervals in the circumferential direction.

The guide piece 6 is formed on an outside surface of every cage bar 5b, projecting toward the raceway surface 3a of the outer ring 3. The guide piece 6 includes a sliding contact portion 6a at an edge thereof for sliding contact with the raceway surface 3a.

The guide piece 6 has a triangular cross-sectional profile. The guide piece is formed with first tapered faces 6b defined by a pair of axially extending side surfaces and inclined from the cage bar 5b substantially toward a circumferential center of the sliding contact portion 6a. The sliding contact portion 6a is sharpened throughout the axial full length thereof (see FIG. 3).

The above arrangement is adapted to guide the rotation of the cage 5 favorably because the sliding contact portions 6a of the guide pieces 6 make sliding contact with the raceway surface 3a during the rotation of the cylindrical roller bearing 1. As the cage 5 rotates relative to the raceway surface 3a in a direction of an arrow X in FIG. 3, the sliding contact portion 6a is adapted not only to scrape away an excess grease Gb (hatched area in FIG. 3) of the grease G on the raceway surface 3a but also to transfer the excess grease Gb toward the axially opposite ends of the outer ring 3. This is effective to prevent the excess grease Gb from accumulating on the raceway surface 3a while allowing a proper amount of grease Ga to form a thin uniform layer (non-hatched area in FIG. 3) on the entire raceway surface 3a. It is therefore possible to prevent the rise in bearing torque induced by the excess lubricant Gb accumulated on the raceway surface 3a. What is more, the sliding contact portion 6a has a sharp edge defined by the pair of first tapered faces 6b such as to make linear contact with the raceway surface 3a over the axial full length of the sliding contact portion 6a. Hence, the sliding contact portion 6a is reduced in sliding contact resistance. The cylindrical roller bearing can achieve the reduction of bearing torque in contrast to the conventional cylindrical roller bearing wherein the guide portions of the cage make surface contact.

As shown in FIG. 1, the guide piece 6 is configured in a manner such that an axial full length L1 of a base portion thereof is equal to an axial full length L3 of the raceway surface 3a of the outer ring 3. Formed at axially opposite ends of the guide piece 6 are second tapered faces 6c inclined from the cage bar 5b substantially toward an axial center of the sliding contact portion 6a. Accordingly, an axial full length L2 of the sliding contact portion 6a defining an edge of the guide piece 6 is shorter than the axial full length L3 of the raceway surface 3a and is also shorter than an axial full length L4 of the cylindrical roller 4. It is noted that the axial full length L4 of the cylindrical roller 4 is equal to or shorter than the axial full length L3 of the raceway surface 3a (equal to the axial full length L3 of the raceway surface 3a in this embodiment).

This leads to the following advantage. If the sliding contact portion 6a is axially deviated to either one side relative to the raceway surface 3a during the rotation of the cylindrical roller bearing 1, a region out of sliding contact with the sliding contact portion 6a (L3-L2, L4-L2) always exists on the other side of the raceway surface 3a. Namely, there always exists the region from which the grease G is not removed and hence, it is ensured that the proper amount of grease Ga is allowed to remain on the raceway surface 3a. Therefore, failure to supply the proper amount of grease Ga can be obviated even under a condition where the supply of the proper amount of grease Ga tends to fail as a result of removing the excess grease Gb from the raceway surface 3a throughout the axial full length thereof.

Figure 3:
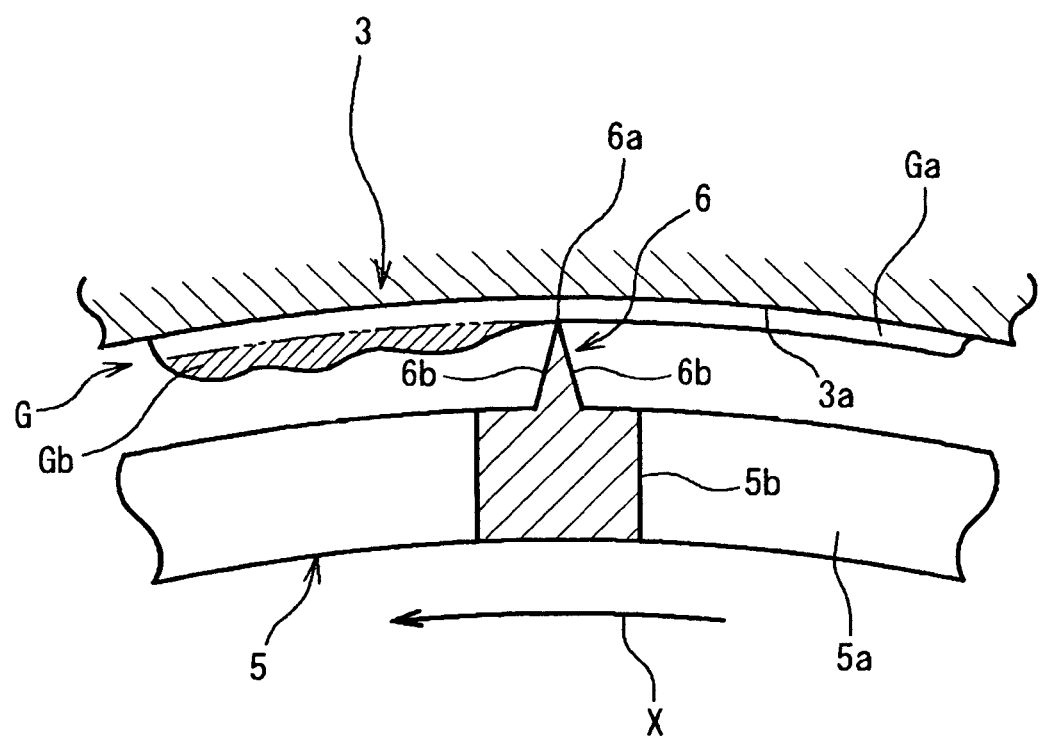
FIG. 3 is a circumferential cross-sectional view showing a guide piece and its neighborhood.
Figure 4:
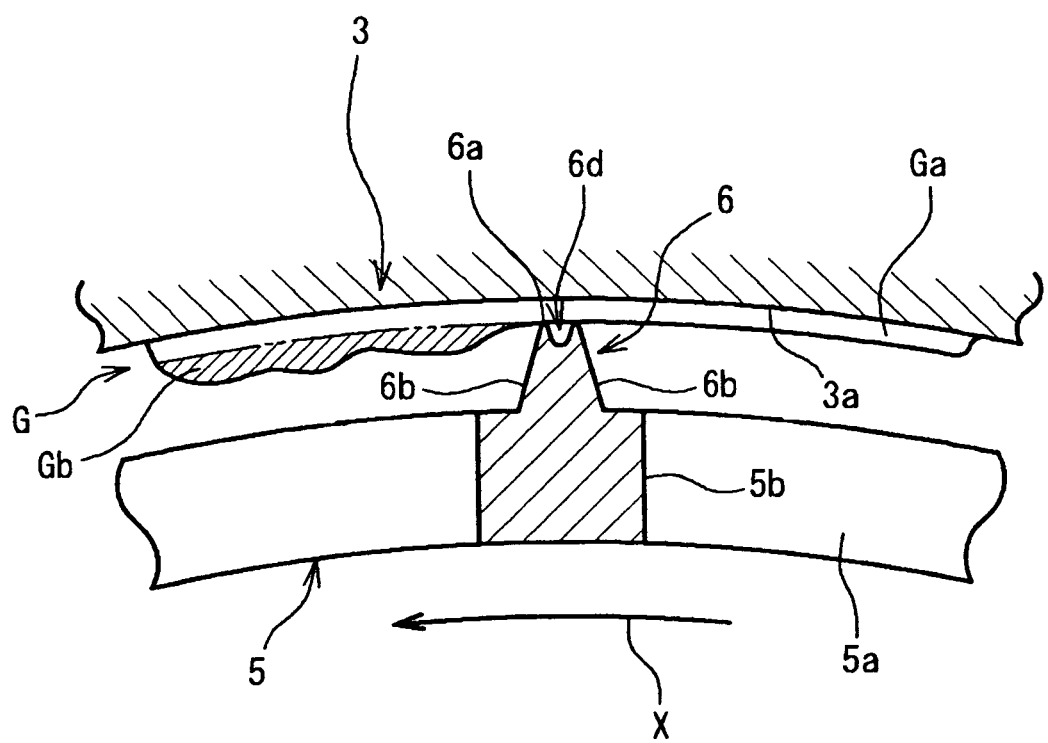
FIG. 4 is a circumferential cross-sectional view showing a guide piece and its neighborhood of a cylindrical roller bearing according to a second embodiment of the present invention.

FIG. 4 is a sectional view showing a substantially axial center of a guide piece 6 of a cylindrical roller bearing 1 according to a second embodiment of the present invention. The figure corresponds to FIG. 3 showing the first embodiment. The second embodiment of FIG. 4 differs from the first embodiment in that a sliding contact portion 6a of the guide piece 6 is formed in a flat surface and is formed with a recess 6d for temporarily holding the grease G.

According to this embodiment, the grease G held in the recess 6d can be supplied to the raceway surface 3a during the rotation of the cylindrical roller bearing 1 even under the condition where the supply of the proper amount of grease Ga tends to fail. Thus, the failure to supply the proper amount of grease Ga can be obviated.

Figure 5:
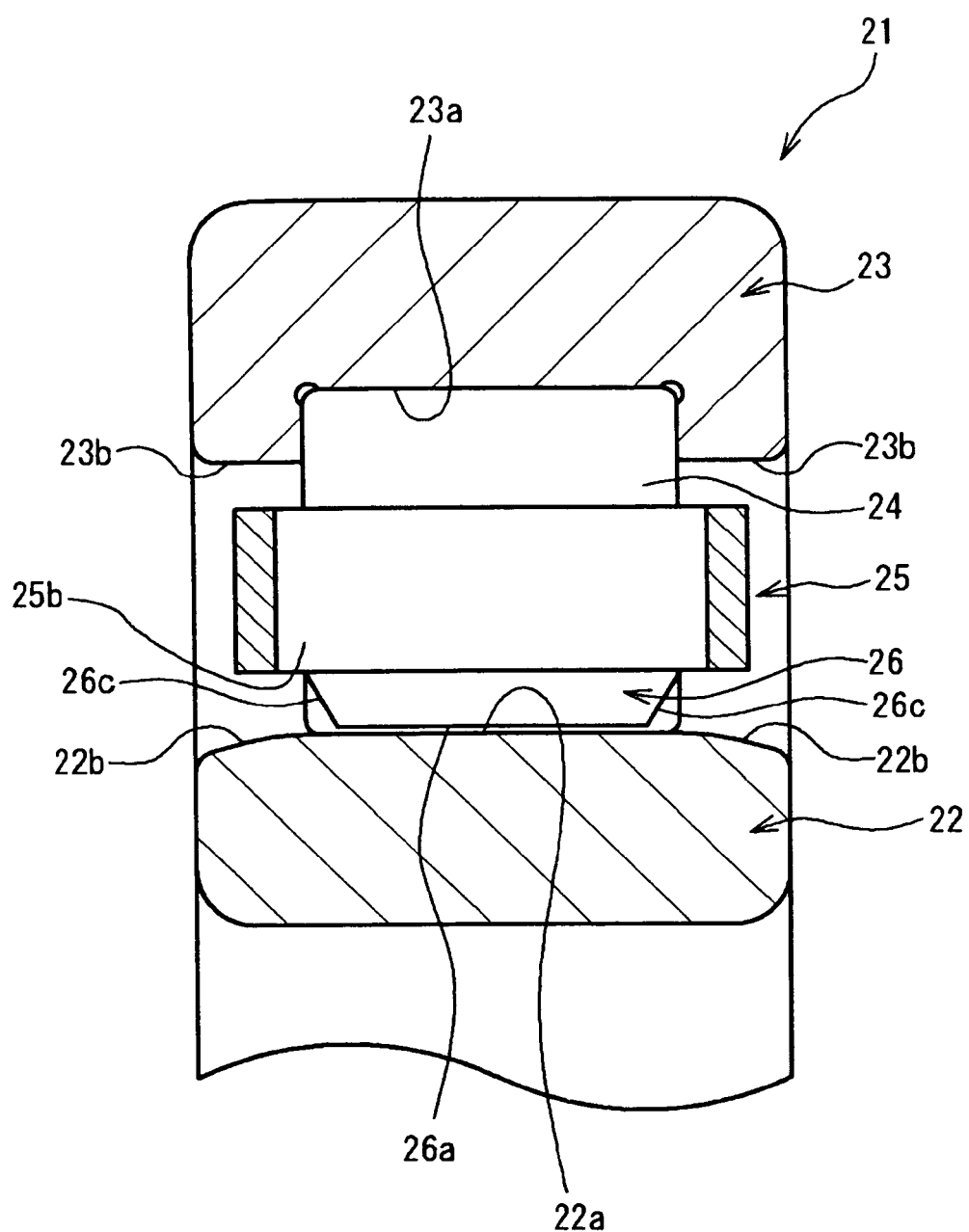
FIG. 5 is a sectional view showing a cylindrical roller bearing according to a third embodiment of the present invention.

FIG. 5 is a sectional view showing a cylindrical roller bearing of ribbed outer ring type 21 according to a third embodiment of the present invention. The third embodiment differs from the first embodiment in that an outer ring 23 is provided with ribs but an inner ring 22 is without ribs and that a cage 25 is formed with guide pieces 26 on a side opposite to a raceway surface 22a of the inner ring 22. Referring to FIG. 5, the inner ring 22 includes a raceway surface 22a formed axially centrally on an outer periphery thereof, allowing cylindrical rollers 24 to roll on the raceway surface 22a. The inner ring 22 is formed with tapered surfaces 22b at axially opposite ends of the raceway surface 22a, the tapered surface progressively increased in diameter in axially inward direction. The outer ring 23 includes a raceway surface 23a formed axially centrally on an outer periphery thereof, allowing the cylindrical rollers 24 to roll on the raceway surface 23a. The outer ring 23 is integrally formed with ribs 23b which extend from lateral sides of the axially opposite ends of the raceway surface 23a and project toward the inner ring 22.

The guide piece 26 projects from an inside surface of every cage bar 25b toward the raceway surface 22a of the inner ring 22. The guide piece includes a sliding contact portion 26a at an edge thereof for sliding contact with the raceway surface 22a of the inner ring 22. The sliding contact portion 26a makes sliding contact with the raceway surface 22a during the rotation of the cylindrical roller bearing 21 thereby favorably guiding the rotation of the cage 25.

In the third embodiment, the sliding contacting portion 26 is adapted not only to scrape away an excess grease (not shown) on the raceway surface 22a but also to transfer the excess grease toward the axially opposite ends of the inner ring 22, as the cage 25 rotates relative to the raceway surface 22a. This allows a proper amount grease (not shown) to form a thin uniform layer on the entire raceway surface 22a while preventing the excess grease from accumulating on the raceway surface 22a. It is therefore possible to prevent the rise in bearing torque induced by the excess lubricant accumulated on the raceway surface.

Figure 6:
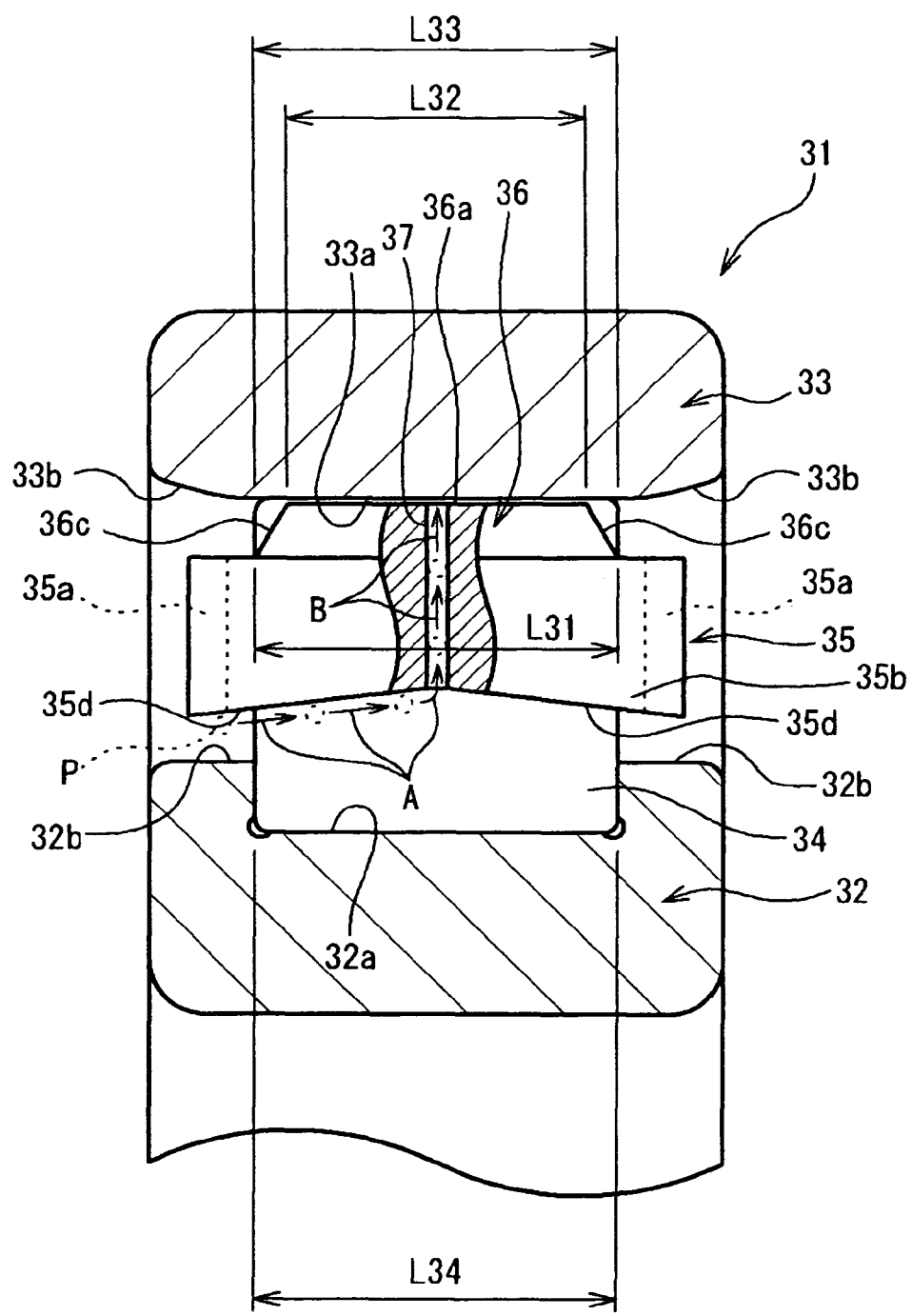
FIG. 6 is a sectional view showing a cylindrical roller bearing according to a fourth embodiment of the present invention.

FIG. 6 is a sectional view showing a cylindrical roller bearing of ribbed inner ring type 31 according to a fourth embodiment of the present invention.

Referring to FIG. 6, the cylindrical roller bearing 31 includes an inner ring 32 fixed to an unillustrated rotary shaft, an outer ring 33 fixed to an unillustrated housing, a plurality of cylindrical rollers 34 rollably disposed between the inner ring 32 and the outer ring 33, and a cage 35 for circumferentially retaining the individual cylindrical rollers 34 at equal intervals.

The inner ring 32 includes a raceway surface 32a formed axially centrally on an outer periphery thereof, allowing the cylindrical rollers 34 to roll on the raceway surface 32a. The inner ring 32 is integrally formed with ribs 32b which extend from lateral sides of the axially opposite ends of the raceway surface 32a and project toward the outer ring 33.

The outer ring 33 includes a raceway surface 33a formed axially centrally on an inner periphery thereof, allowing the cylindrical rollers 34 to roll thereon. The outer ring 33 is formed with tapered surfaces 33b at axially opposite ends of the raceway surface 33a, the tapered surface progressively increased in diameter in axially outward direction.

An injection nozzle (not shown) feeds an oil-air mixture P as a lubricant through a gap between an inner periphery of the cage 35 and the outer periphery of the inner ring 32. The oil-air mixture P fed into the cylindrical roller bearing 31 contains oil particles, which adhere to the inside of the cylindrical roller bearing 31 or particularly to the inner periphery of the cage 35, the cylindrical rollers 34, the outer periphery of the inner ring 32 and the like. The adherent oil particles form oil aggregates O, which migrate to rolling contact surfaces between the cylindrical roller 34 and the raceway surface 32a of the inner ring 32 and between the cylindrical roller 34 and the raceway surface 33a of the outer ring 33 as well as to sliding contact surfaces between the cylindrical roller 34 and the rib 32b and between the cylindrical roller 34 and the cage 35, thereby lubricating these rolling contact surfaces and sliding contact surfaces.

Figure 7:
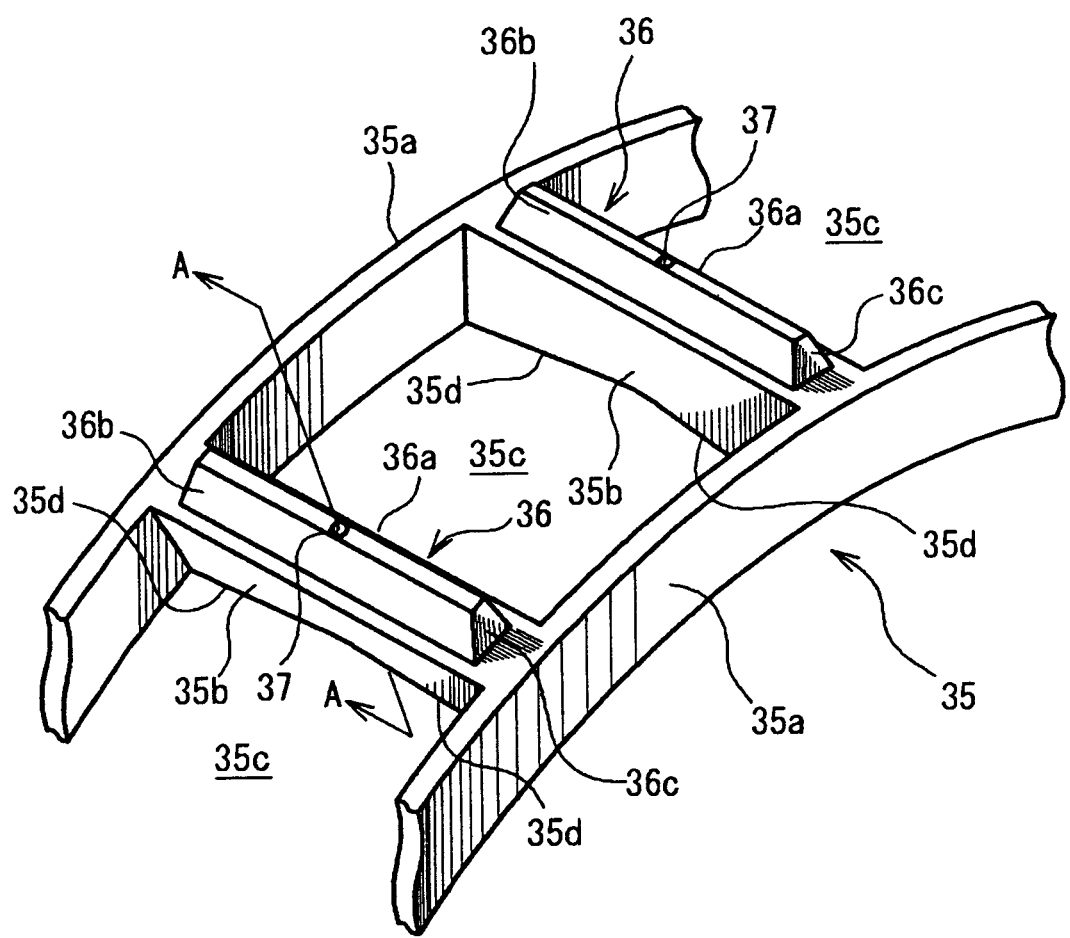
FIG. 7 is a fragmentary perspective view showing an essential part or a cage of the cylindrical roller bearing shown in FIG. 6.

FIG. 7 is a perspective view showing a part of the cage 35. The cage 35 is formed from PEEK (poly-ether ether ketone) resin. The cage includes a pair of annular portions 35a axially spaced from each other, a plurality of cage bars 35b arranged circumferentially on the annular portions at equal intervals and interconnecting the annular portions 35a, and guide pieces 36 for guiding the rotation of the cage 35. The cage receives the individual cylindrical rollers 34 in respective pockets 35c enclosed by respective pairs of adjoining cage bars 35b and the pair of annular portions 35a, thereby circumferentially retaining the cylindrical rollers 4 at the predetermined intervals.

The guide piece 36 is formed on an outside surface of every cage bar 35b, projecting toward the raceway surface 33a of the outer ring 33. The guide piece 36 includes a sliding contact portion 36a at an edge thereof for sliding contact with the raceway surface 33a. This sliding contact portion 36a is formed in a flat surface, a circumferential corner of which makes linear contact with the arcuate-shaped raceway surface 33a on an axial full length thereof.

Figure 8:
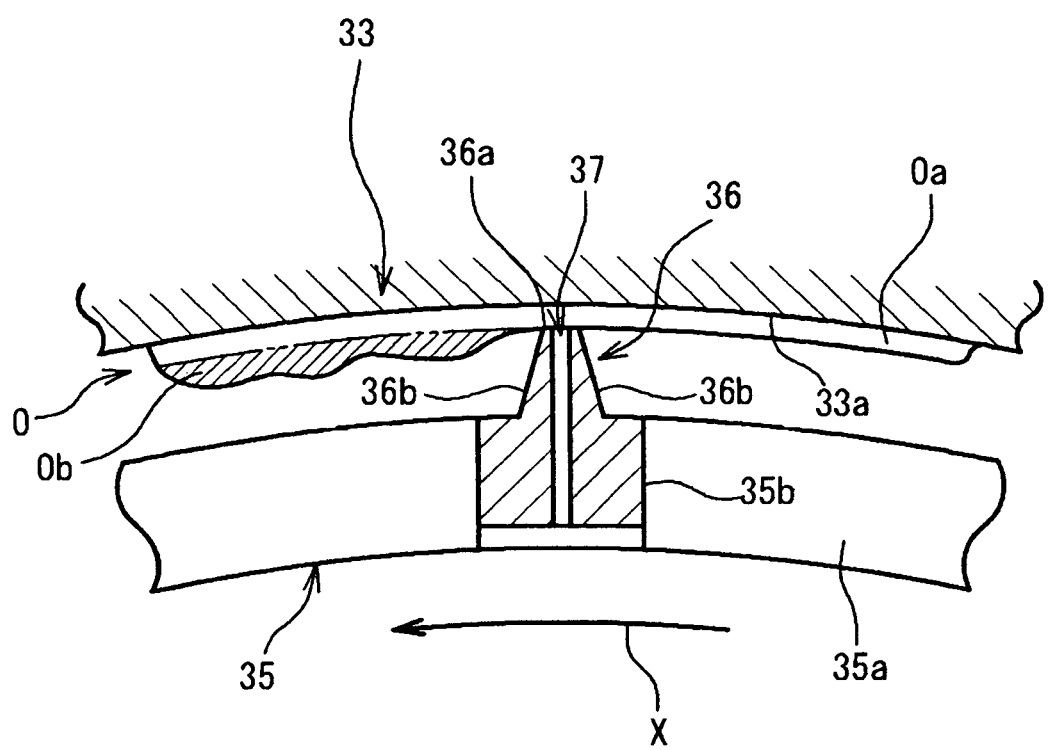
FIG. 8 is a sectional view taken on the line A-A in FIG. 7.

The guide piece 36 is formed with first tapered faces 36b defined by a pair of axially extending sides and inclined from the cage bar 35b substantially toward a circumferential center of the sliding contact portion 6a (see FIG. 8).

As shown in FIG. 6, the guide piece 36 is formed in a manner such that an axial full length L31 of a base portion thereof is equal to an axial full length L33 of the raceway surface 33a of the outer ring 33. Formed at axially opposite ends of the guide piece 36 are second tapered faces 36c inclined from the cage bar 35b substantially toward an axial center of the sliding contact portion 36a. Accordingly, an axial full length L32 of the sliding contact portion 36a defining an edge of the guide piece 36 is shorter than the axial full length L33 of the raceway surface 33a and is also shorter than an axial full length L34 of the cylindrical roller 34. It is noted that the axial full length L34 of the cylindrical roller 34 is equal to or shorter than the axial full length L33 of the raceway surface 33a (equal to the axial full length L33 of the raceway surface 33a in this embodiment).

Each of the cage bars 35b is formed with a pair of tapered faces 35d on an inside surface thereof, the tapered faces being progressively increased in diameter substantially toward an axial center of the inside surface. At the substantial axial center where these tapered faces 35d intersect with each other, there is formed a through hole 37 which extends through the cage bar to a substantial axial center of the sliding contact portion 36a.

The fourth embodiment of the above arrangement is capable of favorably guiding the rotation of the cage 35 because the sliding contact portion 36a of the guide piece 36 makes sliding contact with the raceway surface 33a during the rotation of the cylindrical roller bearing 31. As the cage 35 rotates relative to the raceway surface 33a in a direction of an arrow X in FIG. 8, the sliding contact portion 36a is adapted not only to scrape away an excess oil Ob (hatched area in FIG. 8) of the oil O on the raceway surface 33a but also to transfer the excess oil Ob toward the axially opposite ends of the outer ring 33. This is effective to prevent the excess oil Ob from accumulating on the raceway surface 33a while allowing a proper amount oil Oa to form a thin uniform layer (non-hatched area in FIG. 8) on the entire raceway surface 33a. It is therefore possible to prevent the rise in bearing torque induced by the excess oil Ob accumulated on the raceway surface 33a.

A centrifugal force accompanying the rotation of the cage 35 moves the oil O, supplied by oil-air lubrication through the gap between the inside surface of the cage bar 35b and the inner periphery of the inner ring 32, along the tapered faces 35d to the substantial axial center of the inside surface of the cage bar 35b, where the oil O flows into the through-hole 37 through a lower end thereof (arrows A in FIG. 6). The above centrifugal force further drives the oil O to flow through the through-hole 37 radially outwardly so that the oil O is supplied from the sliding contact portion 36a defining an upper end of the through-hole 27 onto the raceway surface 33a of the outer ring 33 (arrows B in FIG. 6). This makes it possible to obviate the short supply of the oil O even under the condition where the supply of oil O tends to run short as a result of removing the excess oil Ob from the raceway surface 33a throughout the axial full length thereof.

The sliding contact portion 36a is formed in a manner such that the axial full length L32 thereof is shorter than the axial full length L33 of the raceway surface 33a. Therefore, if the sliding contact portion 36a is axially deviated to either one side relative to the raceway surface 33a during the rotation of the cylindrical roller bearing 31, a region out of sliding contact with the sliding contact portion 36a (L33-L32) always exists on the other side of the raceway surface 33a. Namely, there always exists the region from which the oil O is not removed and hence, the proper amount of oil Oa is allowed to remain on the raceway surface 33a. This makes it possible to obviate the short supply of oil O even under the condition where the supply of oil O tends to run short as a result of removing the excess oil Ob from the raceway surface 33a throughout the axial full length thereof. On the other hand, the oil O allowed to remain at least on one axial side of the raceway surface 33a spreads over the raceway surface 33a due to the effect of surface tension or the like, so that the proper amount of oil can be supplied onto a rolling surface of the raceway surface 33a, on which the cylindrical rollers 34 are rolled.

Since the sliding contact portion 36a is so formed as to have the shorter axial full length L32 than the axial full length L34 of the cylindrical roller 34, a region from which the oil O is not removed (L34-L32) always exists at least on one axial side of the rolling surface of the raceway surface 33a, on which the cylindrical rollers 34 are rolled during the rotation of the cylindrical roller bearing 31. Hence, the proper amount of oil Oa is allowed to remain on the rolling surface 33a. This makes it possible to obviate the failure to supply the proper amount of oil Oa even under the condition where the supply of the proper amount of oil Oa tends to fail as a result of removing the excess oil Ob from the rolling surface throughout the axial full length thereof. On the other hand, the oil O allowed to remain at least on one axial side of the rolling surface is spread by the rolling cylindrical rollers 34 whereby the proper amount of oil O can be supplied onto the rolling surface.

The sliding contact portion 36a can achieve a reduced sliding contact resistance because the sliding contact portion 36a is adapted to make the linear contact with the raceway surface 33a on the axial full length thereof. The cylindrical roller bearing of the embodiment can achieve the reduction of bearing torque in contrast to the conventional cylindrical roller bearing wherein the guide portions of the cage make the surface contact.

Figure 9:
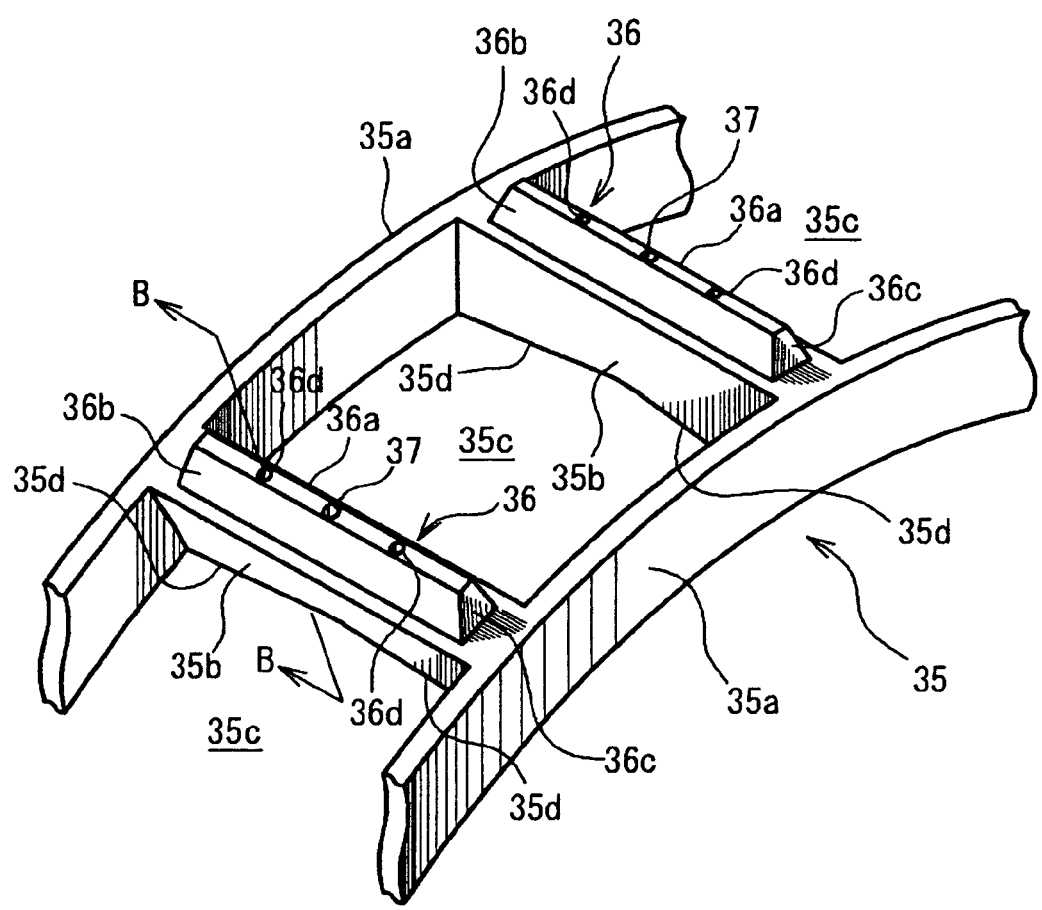
FIG. 9 is a fragmentary perspective view showing an essential part of a cage of a cylindrical roller bearing according to a fifth embodiment of the present invention.
Figure 10:
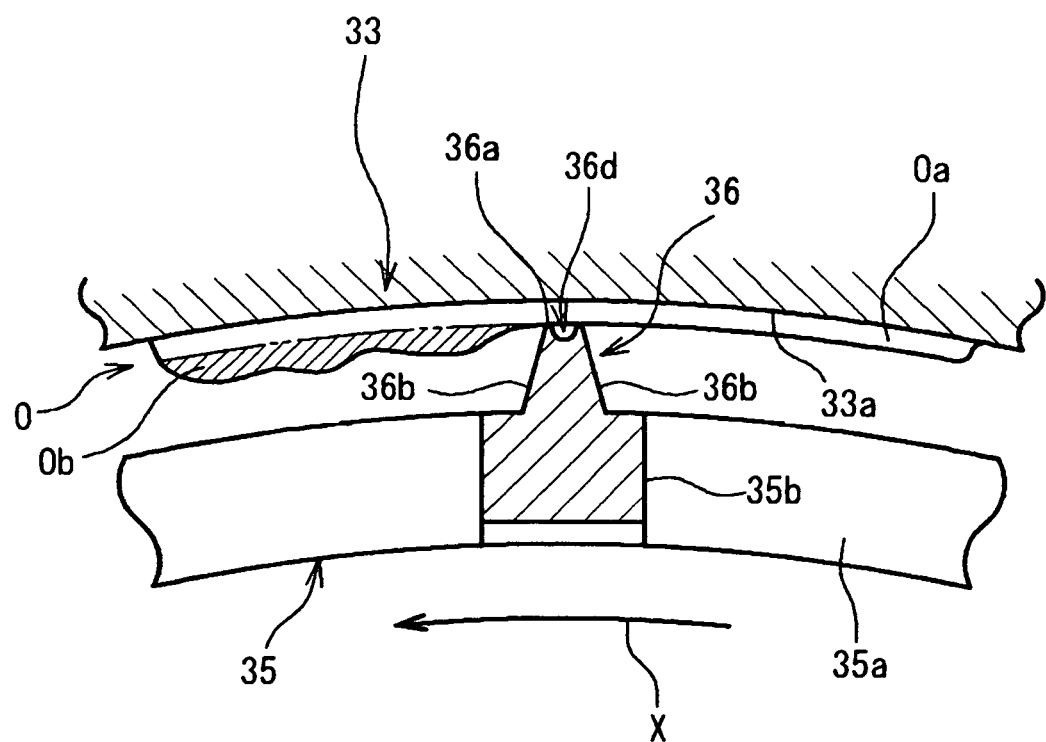
FIG. 10 is a sectional view taken on the line B-B in FIG. 9.

FIG. 9 and FIG. 10 illustrate a cylindrical roller bearing 31 according to a fifth embodiment of the present invention. FIG. 9 is a perspective view showing an essential part of a cage 35. FIG. 10 is a sectional view taken on the line B-B in FIG. 9.

Referring to FIG. 9 and FIG. 10, the fifth embodiment differs from the fourth embodiment in that a sliding contact portion 36a of a guide piece 36 includes a recess 36d for temporarily holding the oil O. The recesses 36d are formed at two places on axially opposite sides with respect to the through-hole 37.

According to the embodiment, the failure to supply the proper amount of oil Oa can be obviated because the oil O held in the recesses 36d can be supplied to the raceway surface 33a even under the condition where the cylindrical roller bearing 31 is prone to failure to supply the proper amount of oil Oa while the bearing is rotating.

The present invention is not limited to the foregoing embodiments but modifications or changes may be made thereto as needed. While the first to third embodiments, for example, are arranged such that the guide piece 6, 26 makes sliding contact with the raceway surface of the bearing ring without the ribs, the guide piece may also be adapted to make sliding contact with the raceway surface of the bearing ring with the ribs. Furthermore, while the foregoing embodiments are arranged such that the sliding contact portion 6a, 26a, 36a of the guide piece 6, 26, 36 makes linear contact with the raceway surface, they may also make surface contact.

In the foregoing embodiments, the guide piece 6, 26, 36 has the axially opposite ends defined by the tapered faces (the second tapered faces 6c, 26c, 36c) such that the sliding contact portion 6a, 26a, 36a of the guide piece 6, 26, 36 has the shorter axial full length L2, L32 than the axial full length L3, L33 of the raceway surface and than the axial full length L4, L34 of the cylindrical roller. However, the axially opposite ends of the guide piece may also be defined by vertical faces in a case where the base portion of the guide piece 6, 26, 36 has the shorter axial full length L1, L31 than the axial full length L3, L33 of the raceway surface. What is more, while the foregoing embodiments are arranged such that the guide pieces 6, 26, 36 are formed on all the cage bars 5b, 25b, 35b of the cage 5, 25, 35, it is also possible to form the guide pieces on only some of the cage bars 5b, 25b, 35b. What is required is that the guide pieces 6, 26, 36 are arranged circumferentially on the cage 5, 25, 35 at predetermined space intervals or preferably at equal intervals.

According to the foregoing embodiments, the sliding contact portion 6a, 26a, 36a of the guide piece 6, 26, 36 has the shorter axial full length L2, L32 than the axial full length L3, L33 of the raceway surface 3a, 22a, 33a and than the axial full length L4, L34 of the cylindrical roller. However, in a case where lubrication conditions are not stringent, for example, the sliding contact portion 6a, 26a, 36a of the guide piece 6, 26, 36 may have an axial full length L2, L32 which is equal to or longer than the axial full length L3, L33 of the raceway surface 3a, 22a, 33a and/or equal to or longer than the axial full length L4, L34 of the cylindrical roller 4, 24, 34.

While the fourth and fifth embodiments are arranged such that the guide piece 36 is substantially axially centrally formed with only one through-hole 37, the guide piece 36 may be axially formed with more than one through-holes.

Also, while the fourth and fifth embodiments are arranged such that the guide piece 36 makes sliding contact with the outer-ring raceway surface 33a of the cylindrical roller bearing of ribbed inner ring type 31, the guide piece 36 may also be adapted to make sliding contact with the outer-ring raceway surface of a cylindrical roller bearing of ribbed outer ring type.

What is more, while the fourth and fifth embodiments supply the oil O as the lubricant in the form of the oil-air mixture P, another means may be used to supply the oil O as oil mist or the like.

The invention claimed is:

1. A cylindrical roller bearing comprising:
an inner ring including a raceway surface on an outer periphery thereof;
an outer ring including a raceway surface on an inner periphery thereof;
a plurality of cylindrical rollers rollably disposed between the raceway surface of the inner ring and the raceway surface of the outer ring; and
a cage for circumferentially retaining the cylindrical rollers at predetermined intervals,
wherein the cage is circumferentially provided with a plurality of guide pieces at predetermined intervals,
wherein the plurality of guide pieces are circumferentially provided on an outer periphery of the cage at the predetermined intervals and project toward the raceway surface of the outer ring to make sliding contact with the raceway surface of the outer ring for guiding the rotation of the cage and for removing an excess lubricant on the raceway surface,
wherein at least one guide piece of the plurality of guide pieces comprises a through-hole extending from an inner periphery of the cage to an edge of the guide piece for supplying the lubricant from the inner periphery side of the cage to the raceway surface of the outer ring,
wherein the cage includes a pair of annular portions and a plurality of cage bars interconnecting the annular portions,
wherein the cage bars comprise a pair of tapered faces on an inside surface, the tapered faces being progressively increased in diameter substantially toward an axial center of the inside surface, and
wherein substantially at the axial center, where the tapered faces intersect with each other, comprises the through-hole which extends through the cage bar.

2. The cylindrical roller bearing according to claim 1, wherein a portion of the guide piece that makes sliding contact with the raceway surface has a shorter axial full length than an axial full length of the raceway surface.

3. The cylindrical roller bearing according to claim 1, wherein a portion of the guide piece that makes sliding contact with the raceway surface has a shorter axial full length than an axial full length of the cylindrical roller.

4. The cylindrical roller bearing according to claim 1, wherein the guide piece makes linear contact with the raceway surface.

5. The cylindrical roller bearing according to claim 1, wherein the guide piece includes a recess formed at an edge thereof for holding therein the lubricant for the raceway surface.

* * * * *